June 2, 1931.  L. H. GUMP  1,808,652
SAFETY DEVICE
Filed April 19, 1929  2 Sheets-Sheet 1
Fig. 1.
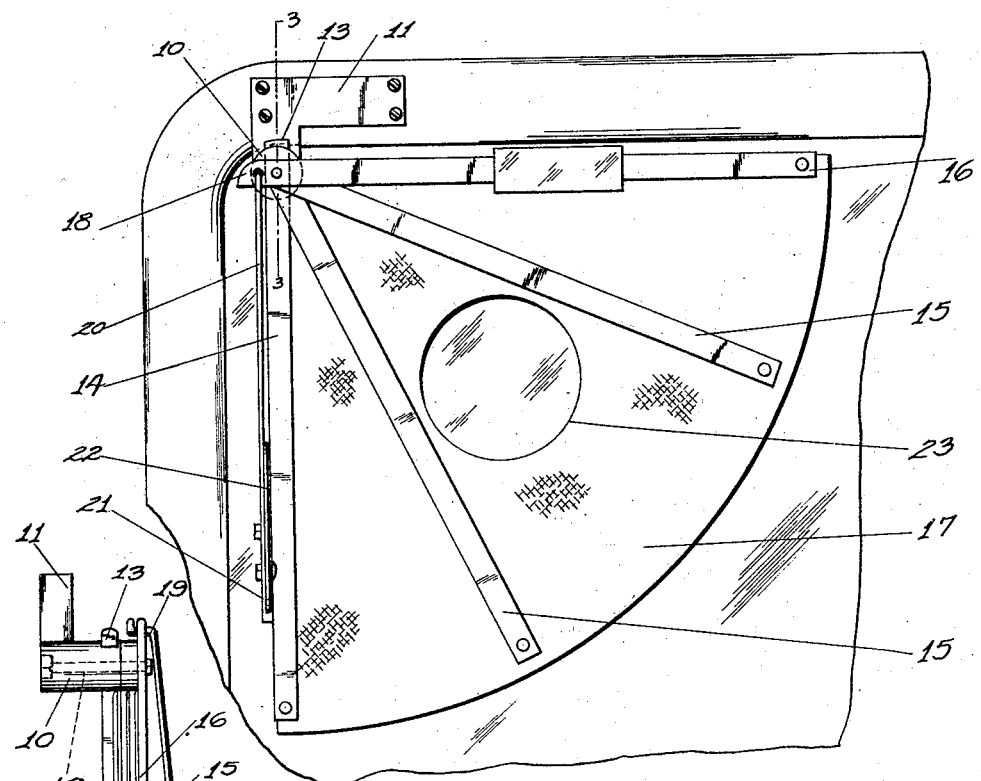
Fig. 2.
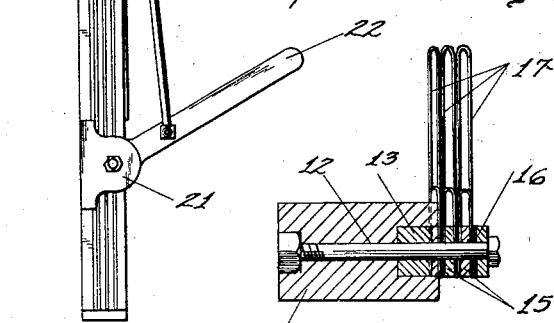
Fig. 3.
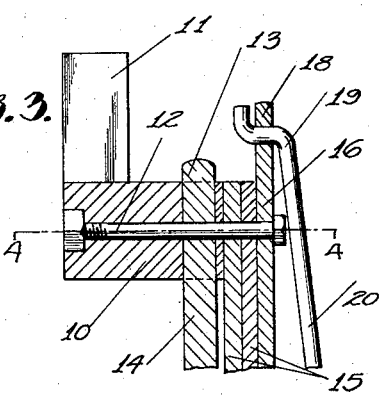
Fig. 4.
L. H. Gump
INVENTOR
BY Victor J. Evans
ATTORNEY
WITNESS:

June 2, 1931. L. H. GUMP 1,808,652
SAFETY DEVICE
Filed April 19, 1929 2 Sheets-Sheet 2

L. H. Gump
INVENTOR
BY Victor J. Evans
ATTORNEY

WITNESS:

Patented June 2, 1931

1,808,652

UNITED STATES PATENT OFFICE

LIAS H. GUMP, OF NEW MARTINSVILLE, WEST VIRGINIA

SAFETY DEVICE

Application filed April 19, 1929. Serial No. 356,463.

This invention relates to new and useful improvements in shields and other devices to protect the eyes of motorists from the light glare of headlights and flying particles from the traction treads of vehicle tires when the windshield is left open.

Another object of the invention contemplates the provision and arrangement of a sight opening in the shield.

An additional object of the invention comprehends a shield of the collapsible type.

More specifically stated the shield is provided with an operating means to extend and contract same any desired distance across the line of vision of the vehicle driver.

With the above and other objects in view, the invention further consists of the following novel features and details of construction, to be hereinafter more fully described, illustrated in the accompanying drawings and pointed out in the appended claim.

In the drawings:—

Figure 1 is an elevation of my invention as applied and extended for use.

Figure 2 is a side elevation of the invention per se.

Figure 3 is a longitudinal sectional view taken on line 3—3 of Figure 1.

Figure 4 is a detail sectional view taken on line 4—4 of Figure 3.

Figure 5:
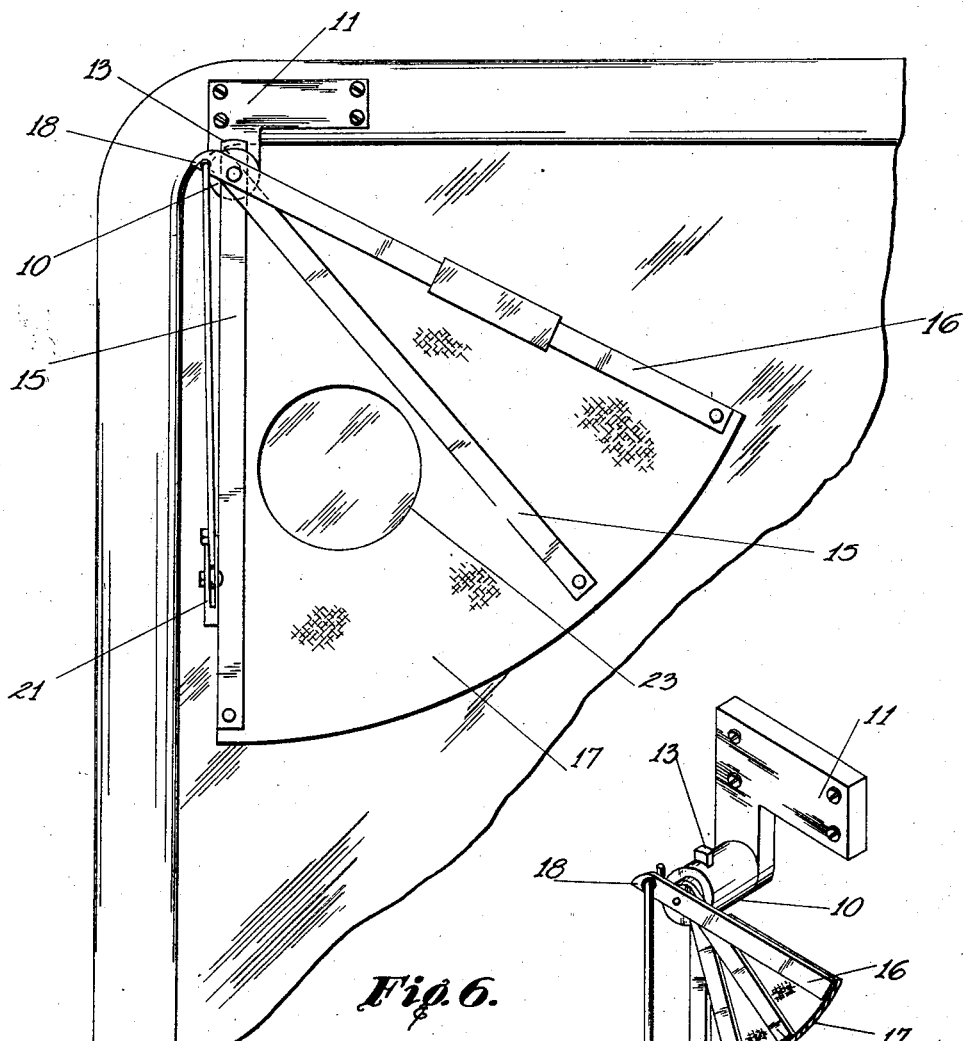
Figure 5 is a view similar to Figure 1 with the invention partly extended.
Figure 6:
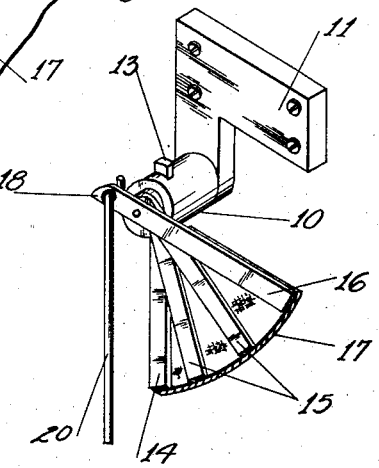
Figure 6 is a fragmentary perspective view of the operating mechanism and shield device.

Referring to the drawings in detail wherein like characters of reference denote corresponding parts, the reference character 10 indicates a sleeve member having a means of fastening in the nature of a bracket 11. Said bracket may be secured to a windshield frame or to an appropriate portion of a vehicle body in the event a vertical sliding type of windshield is employed. A bolt member 12 is passed through the bore of the sleeve and the tongue 13 of the leg 14 extended horizontally therethrough. Said leg is rigidly secured by said connection and preferably disposed to one side of the line of vision of the vehicle driver in the manner suggested in Figures 1 and 5 of the drawings.

Blade members 15, pivotally and swingably mounted at their upper ends upon the projecting end of the bolt 12 in superimposed relation, are adapted to be extended to occupy the Figure 1 position in the manner better understood in the description of my invention to follow. A leg member 16 also swingably mounted upon the bolt 12 adjacent the outermost projecting end thereof operates in conjunction with the leg 14 to stretch or extend a shield 17 therebetween and which may be formed of cloth or leather according to the desires of the user and endurance of the shield material in accordance with climatic conditions. The shield, as shown, is of fan shape having its side edges secured to the legs 14 and 16 respectively whereas its curved edge extending between the ends of the aforementioned arms also skirts the outermost ends of the blades 15 and to which same is secured. By reason of the fact that the shield is connected at its side edges with the arms 14 and 16 and at intervals therebetween with the blades 15, it will be noted that those portions of the shield between the leg 14 and the adjacent blade 15 between the blades 15 and between the blade 15 and arm 16 that successive loops, plaits, or folds will be formed to dispose of the greater bulk of the assembled device in the smallest area possible to avoid interference or in any way impair the vision of the vehicle driver.

The arm 16 has an extension 18 beyond the connection of the bolt 12 therewith and apertured to accommodate the offset end 19 of a connecting rod 20. An ear 21 carried by and rearwardly projecting at rightangles from one side edge of the arm 14 is pivotally connected with an operating lever 22 having eccentric pivotal connection with the connecting rod 20. Movement of the operating lever 22 in different directions for given distances will extend and contract the shield 17 to occupy the extended and contracted positions shown in Figures 1 and 4 of the drawings.

A sight opening 23 is arranged in the shield body between the arms 15, the size of which has been found to be most effective for the purpose intended at 4¾ inches in diameter whereby a clear view of the road in advance of the vehicle may be permitted. The person seated behind a shield of this character and by shifting his line of vision slightly to either side of the opening will avoid temporary blindness by the glare from the headlights of approaching vehicles. As a matter of convenience, the arm 16 may carry a mirror or other reflecting surface in the event the customary rear view mirror is obscured from view when the shield is extended for use. The shield when used upon either side of a windshield will prevent glare upon the windshield from the headlights of vehicles in the rear reflecting upon the inner side of the windshield.

The invention is susceptible of various changes in its form, proportions and minor details of construction, and the right is herein reserved to make such changes as properly fall within the scope of the appended claim.

Having thus described the invention, what is claimed is:—

A glare shield comprising a fixed arm, a plurality of blades pivotally connected therewith, a movable arm swingably mounted upon the fixed arm to occupy a position at rightangles thereto, foldable material of substantial fan shape having connection at the side edges thereof with the fixed and movable arms and at intervals therebetween to said blades, said material having a right opening between said blades, an extension projecting from the mounted end of the movable arm, a connecting arm having connection with said extension, and an operating lever mounted upon the fixed arm having eccentric operative connection with the connecting arm to facilitate coincision and rightangular disposition of said arms respectively.

In testimony whereof I affix my signature.

LIAS H. GUMP.